(12) United States Patent
Wildman

(10) Patent No.: US 7,066,016 B2
(45) Date of Patent: Jun. 27, 2006

(54) CAMSHAFT POSITION SENSOR TESTING SYSTEM

(75) Inventor: Mark A. Wildman, Plainfield, IN (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/818,668

(22) Filed: Apr. 6, 2004

(65) Prior Publication Data

US 2005/0217355 A1 Oct. 6, 2005

(51) Int. Cl.
G01M 15/00 (2006.01)

(52) U.S. Cl. ........................... 73/116; 73/119 R

(58) Field of Classification Search .............. 73/116, 73/117.2, 117.3, 118.1, 119 R
See application file for complete search history.

(56) References Cited

U.S. PATENT DOCUMENTS

| | | | | |
|---|---|---|---|---|
| 5,698,777 A | * | 12/1997 | Ramseyer et al. ............ 73/116 |
| 5,715,780 A | * | 2/1998 | Haller ....................... 123/90.17 |
| 5,987,973 A | * | 11/1999 | Fujii et al. ....................... 73/116 |
| 6,035,707 A | * | 3/2000 | Main ............................ 73/116 |
| 6,324,902 B1 | * | 12/2001 | Kang ........................... 73/116 |
| 6,481,270 B1 | * | 11/2002 | Kobayashi et al. ............ 73/116 |
| 6,655,187 B1 | * | 12/2003 | Lehner et al. ................ 73/1.75 |
| 6,679,107 B1 | * | 1/2004 | Ono et al. .................. 73/117.3 |
| 6,727,689 B1 | * | 4/2004 | Furlong et al. ......... 324/207.25 |
| 2001/0042527 A1 | * | 11/2001 | Uchida ..................... 123/90.15 |
| 2003/0000498 A1 | * | 1/2003 | Mathews et al. ....... 123/406.62 |
| 2003/0216853 A1 | * | 11/2003 | Jacobson ..................... 701/106 |
| 2004/0154566 A1 | * | 8/2004 | Naito et al. .............. 123/90.15 |

* cited by examiner

*Primary Examiner*—Eric S. McCall
(74) *Attorney, Agent, or Firm*—Elias P. Soupos; Susan L. Lukasik; Dennis Kelly Sullivan

(57) ABSTRACT

A camshaft testing system has a test sleeve, a controller, and main voltage supply. The camshaft position sensor is placed into the test sleeve. The controller activates the camshaft position sensor. The test sleeve has a test bar, which moves across the camshaft position sensor. The movement of the test bar creates a magnetic field disruption. An indication is made as to whether the camshaft position sensor can sense the magnetic field disruption. A signal indicator on the controller emits at least one flash of light if the camshaft position sensor senses the magnetic field disruption.

20 Claims, 8 Drawing Sheets

CAMSHAFT POSITION SENSOR TESTING SYSTEM

FIELD OF THE INVENTION

This invention generally relates to devices for testing sensors used in internal combustion engines. More particularly, this invention relates to devices for testing sensors that use a magnetic field to sense the operating parameters of a camshaft in an internal combustion engine.

BACKGROUND OF THE INVENTION

Internal combustion engines convert chemical energy from a fuel into mechanical energy. The fuel may be petroleum-based, natural gas, another combustible material, or a combination thereof. Most internal combustion engines inject an air-fuel mixture into one or more cylinders. The fuel ignites to generate rapidly expanding gases that actuate a piston in the cylinder. The fuel may be ignited by compression such as in a diesel engine or through some type of spark such as the spark plug in a gasoline engine. The piston usually is connected to a crankshaft or similar device for converting the reciprocating motion of the piston into rotational motion. The rotational motion from the crankshaft may be used to propel a vehicle, operate a pump or an electrical generator, or perform other work. A vehicle may be a truck, an automobile, a boat, or the like.

Most internal combustion engines have a camshaft to operate the inlet and exhaust valves on the cylinders in the engine. A camshaft has cams or irregularly shaped projections on a shaft or rod. As the camshaft rotates, the cams turn the rotating motion into a reciprocating motion for operation of the valves. The crankcase usually rotates the camshaft through a cam gear.

Many internal combustion engines have a camshaft position (CMP) sensor near a target wheel mounted on the cam gear. CMP sensors generally produce an output signal in respond to the presence or interruption of a magnetic field. The output signal may be digital or analog and usually is proportional to the magnetic field strength. The target wheel usually has a disk shape with openings or windows along the circumference. The target wheel may have vanes or blades extending from a center hub. As the target wheel rotates, the windows or vanes pass through the magnetic field of the CMP sensor. The windows or vanes disrupt the magnetic field thus causing the CMP sensor to produce or change the output signal. A vehicle's on-board computer or electronics can determine the speed, position, and other operating parameters of the camshaft from the output signal. From the camshaft speed and position, the on-board computer or electronics can determine the engine speed and the position of the piston within each cylinder.

The CMP sensor usually is replaced when operating improperly. The CMP sensor may be replaced during engine repairs or maintenance even when working properly. Many internal combustion engines do not operate when there is no output signal from the CMP sensor. When the output signal is not present, the vehicle's on-board computer and electronics may generate a no-start condition to prevent operation of the engine. Service technicians can check operation of the CMP sensor using the vehicle's on-board computer, electronics, and tachometer, which may be unreliable given the no-start condition of the engine. Many service technicians replace the CMP sensor as part of a general diagnostic approach if an engine does not start. If the new CMP sensor does not address the no-start or other concerns, the old CMP sensor is not reinstalled even though it may work properly. The replacement of a CMP sensor that works properly may increase the operating and/or maintenance costs of the engine.

SUMMARY

This invention provides a testing system for a camshaft position (CMP) sensor. The CMP sensor is placed into a test sleeve and activated. The CMP sensor testing system indicates whether the CMP sensor senses a magnetic field disruption.

A camshaft position (CMP) sensor testing system may have a test sleeve, a test bar, a controller, and a main voltage supply. The test sleeve forms a cavity. The test bar is rotationally mounted on the test sleeve. The controller has a signal indicator and a reference voltage supply. The signal indicator connects to a CMP sensor when the CMP sensor is positioned in the cavity. The reference voltage supply provides a reference voltage to the CMP sensor when the CMP sensor is positioned in the cavity. The CMP sensor changes a signal in response to a disruption in a magnetic field. The signal indicator intermittently operates in response to the signal. A main voltage supply is connected to signal connector. The main voltage supply provides a supply voltage to the signal connector.

In a method for testing a camshaft position (CMP) sensor, the CMP sensor is inserted into a test sleeve. The CMP sensor is activated. A magnetic field disruption is applied to the CMP sensor. An indication is made whether the CMP sensor senses the magnetic field disruption.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
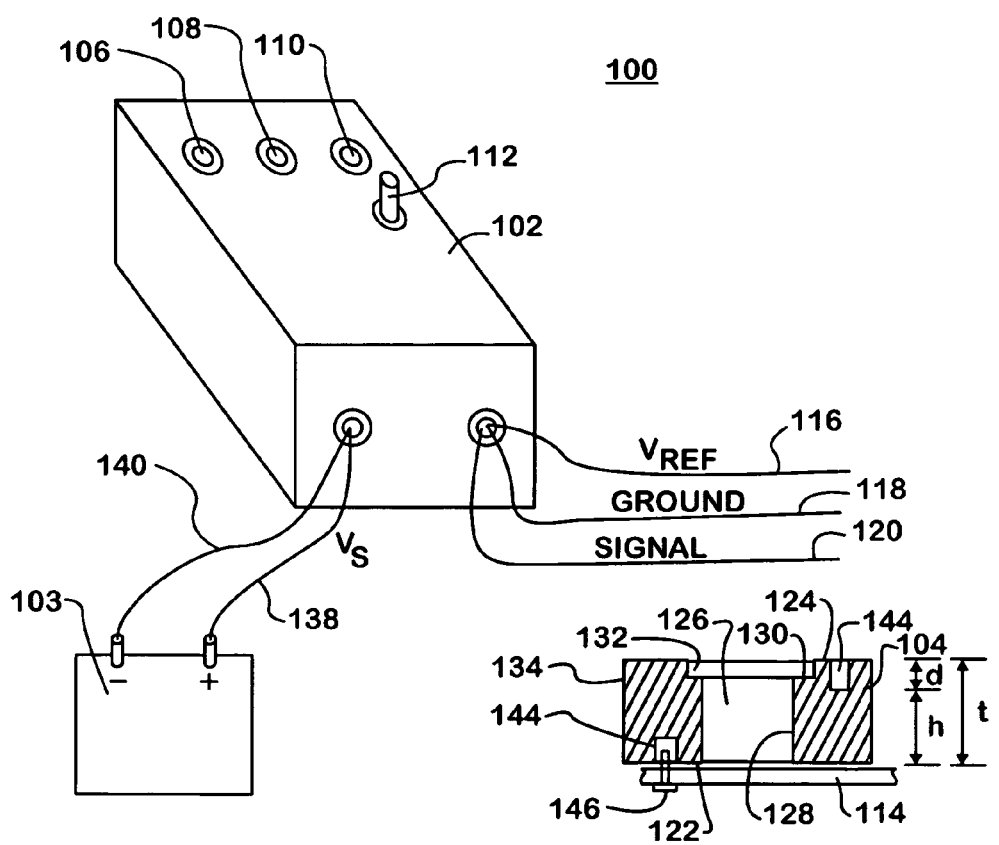
FIG. 1 is a schematic view of a camshaft position (CMP) sensor testing system.
Figure 2:
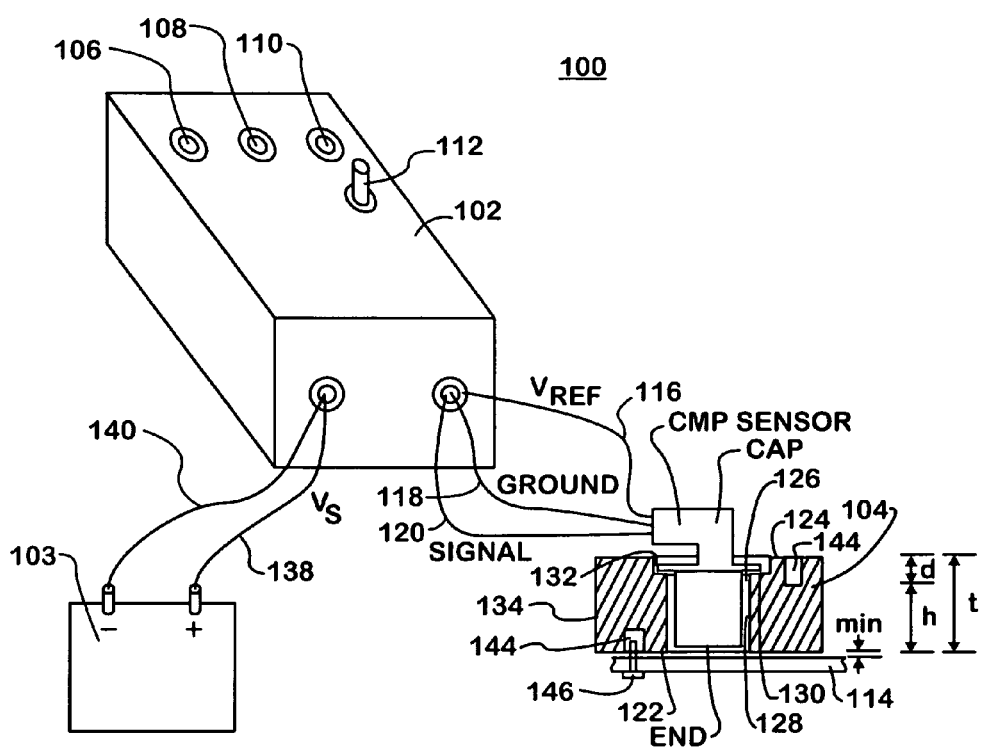
FIG. 2 is a schematic view of the CMP sensor testing system of FIG. 1 with a CMP sensor inserted in the test sleeve to face a test bar on the minimum clearance side.
Figure 3:
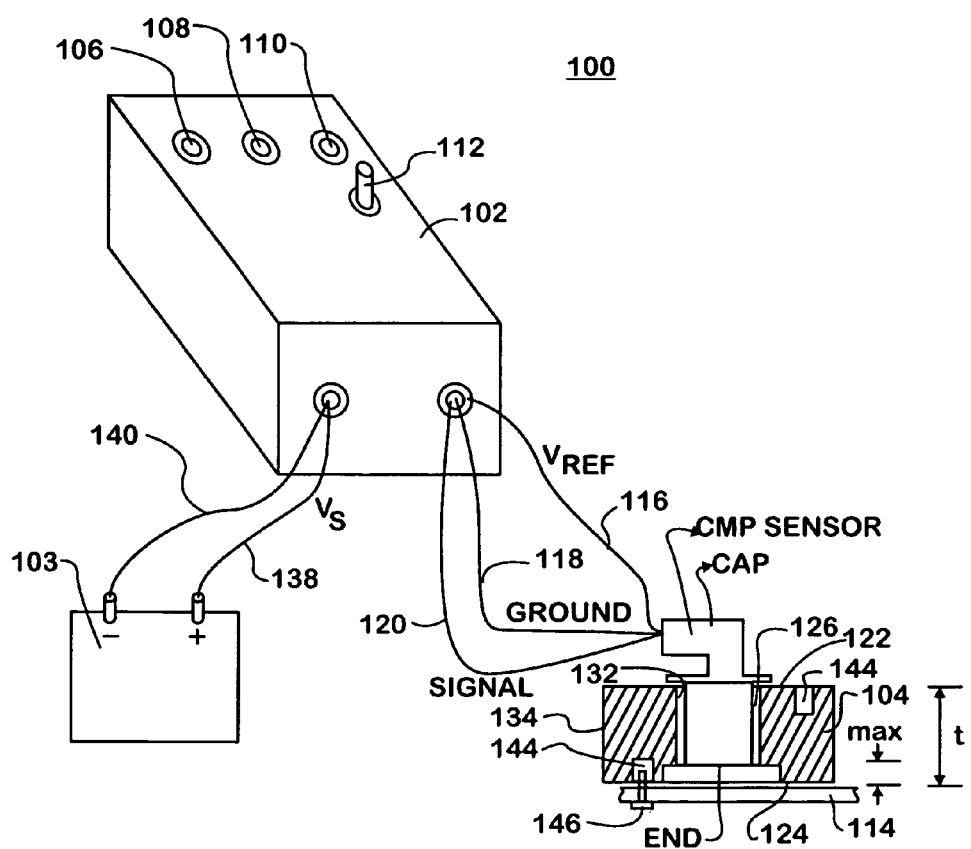
FIG. 3 is a schematic view of the CMP sensor testing system of FIG. 1 with the CMP sensor inserted in the test sleeve to face a test bar on the maximum clearance side.
Figure 4:
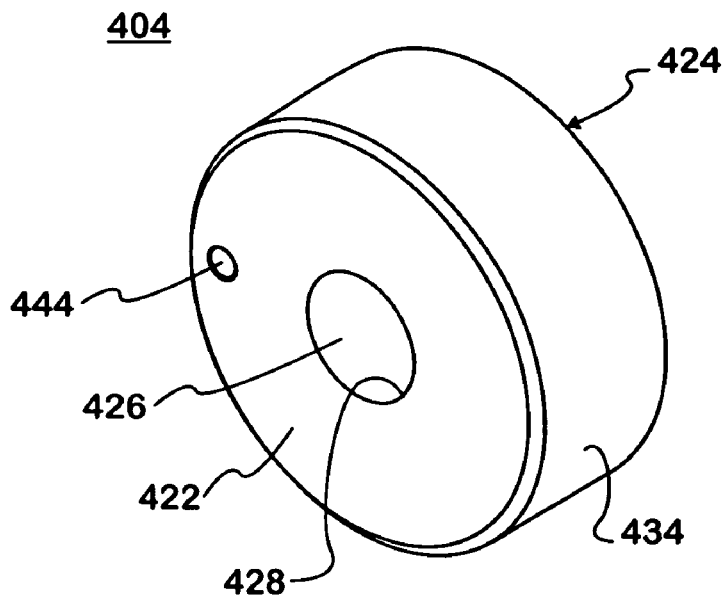
FIG. 4 is a perspective view of the minimum clearance side on another test sleeve for a CMP sensor testing system.
Figure 5:
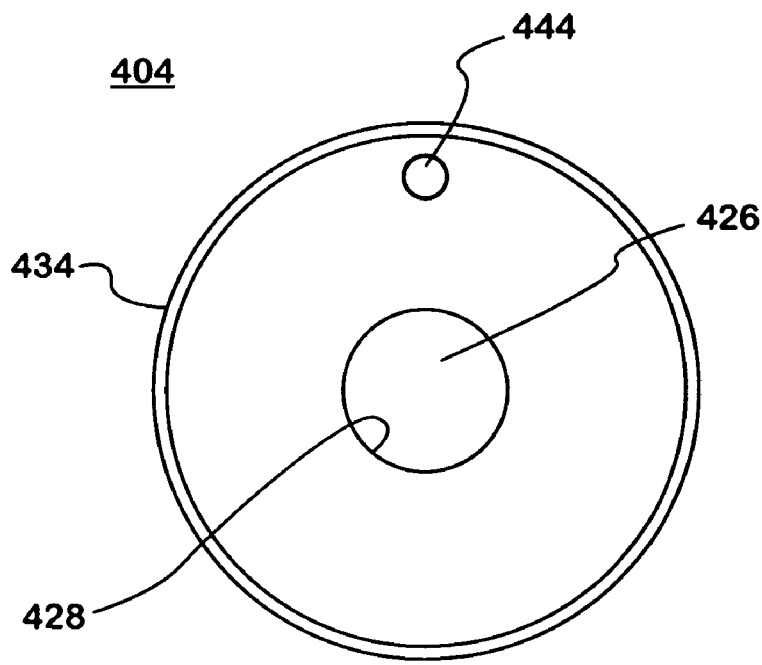
FIG. 5 is a face view of the minimum clearance side on the test sleeve of FIG. 4.
Figure 6:
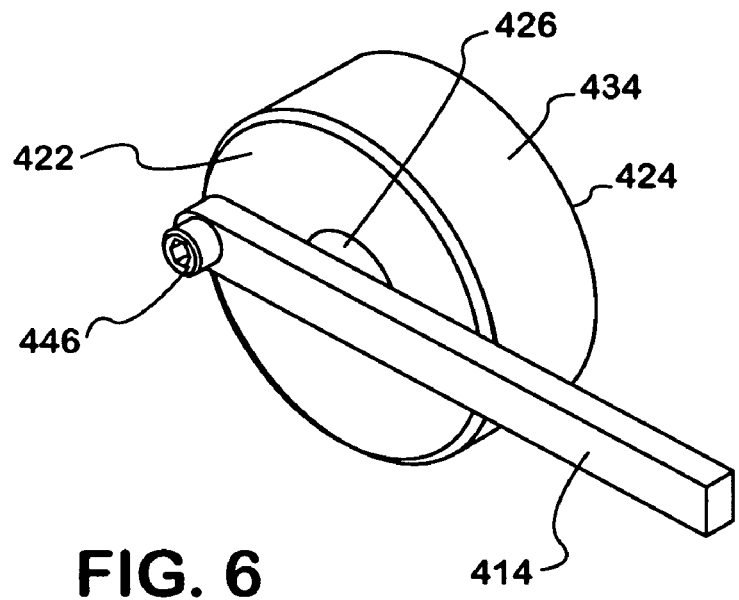
FIG. 6 is a perspective view of the minimum clearance side on the test sleeve of FIG. 4 with a test bar.
Figure 7:
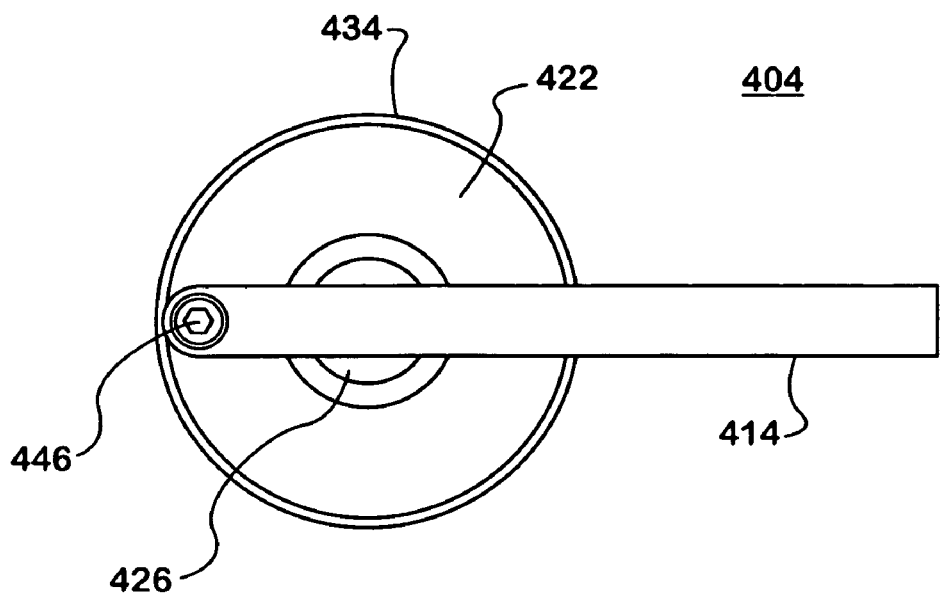
FIG. 7 is a face view of the minimum clearance side on the test sleeve of FIG. 6.
Figure 8:
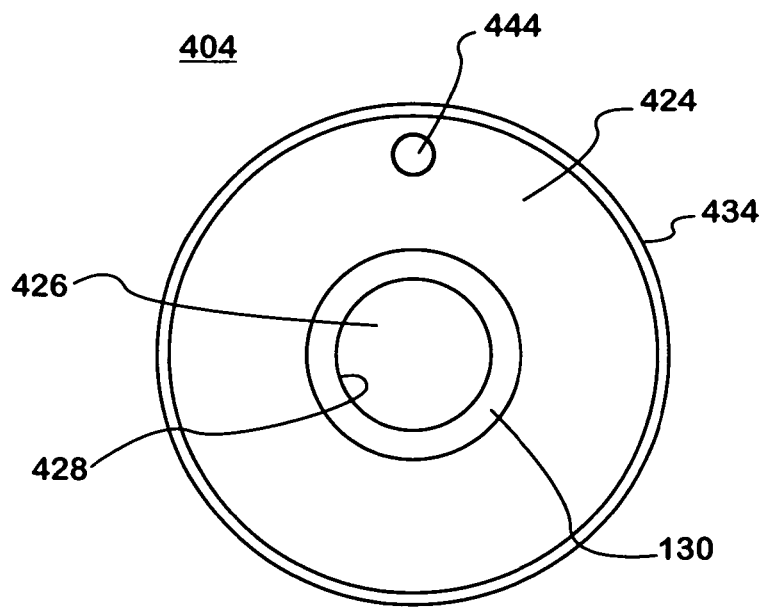
FIG. 8 is a face view of the maximum clearance side on the test sleeve of FIG. 4.
Figure 9:
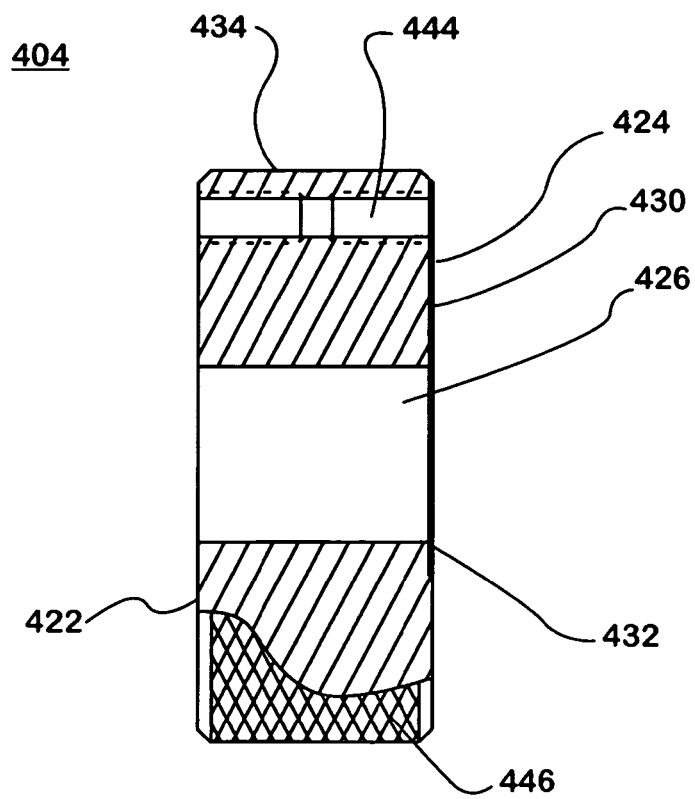
FIG. 9 is a cross-section view of the test sleeve of FIG. 4.

FIG. 1 is a schematic view of a camshaft position (CMP) sensor testing system 100. FIGS. 2–3 are schematic views of the CMP sensor testing system 100 with a camshaft position (CMP) sensor. The CMP sensor testing system 100 has a controller 102, a main voltage supply 103, and a test sleeve 104. The controller 102 is connected to the main voltage supply 103 by a supply wire 138 and a ground wire 140. The controller 102 has a main voltage indicator 106, a signal indicator 108, a reference voltage $V_{REF}$ indicator 110, and a test switch 112. The test sleeve 104 has a test bar 114 that is rotationally connected by a bolt 134. The controller 102 has a $V_{REF}$ wire 116, a ground wire 118, and a signal wire 120. The wires 116, 118, and 120 are connected to the CMP sensor when the CMP sensor is inserted into the sleeve 104. The CMP sensor is activated. A magnetic field disruption is created near the end of the CMP sensor. The controller 102 indicates whether the CMP sensor can sense the magnetic field disruption. While a particular configuration is shown, the CMP test system 100 may have other configurations including those with additional components.

During testing, the test switch 104 is turned-on causing the controller 102 to apply a reference voltage $V_{REF}$ to the CMP sensor. The test bar 114 is moved across the surface of the test sleeve 104, thus passing over the end of the CMP sensor. The movement of the test bar 114 creates a magnetic field disruption near the end of the CMP sensor. When operating properly, the CMP sensor changes a signal to the signal indicator 108 in response to the magnetic field disruption. The controller 102 indicates whether the CMP sensor has sensed the magnetic field disruption. The signal indicator 108 operates intermittently or emits a flash or flashes of light in response to the signal from the CMP sensor. When there is no change in the signal, the signal indicator 108 does not operate intermittently thus indicating that the CMP sensor has not sensed the magnetic field disruption. When the CMP sensor does not sense the magnetic field disruption, the CMP sensor is deemed to not be working properly.

FIGS. 1–3 show cross-section views of the test sleeve 104. The test sleeve 104 may be configured to test the minimum and maximum clearances of a CMP sensor. The test sleeve 104 may be configured to test other distances from the end of a CMP sensor. The CMP testing system 100 may have separate test sleeves for testing the minimum and maximum clearances of a CMP sensor. The CMP testing system 100 may have multiple test sleeves for testing different CMP sensors.

The test sleeve 104 has a minimum clearance side 122 and a maximum clearance side 124. The test sleeve 104 forms a cavity 126 with an inside surface 128. The cavity 126 extends from the minimum clearance side 122 to the maximum clearance side 124 along the centerline or axis of the test sleeve 104. The cavity 126 may be formed at other locations in the test sleeve 104. The cavity 126 has a cross-section larger than the body of the CMP sensor and smaller than the cap of the CMP sensor.

The test sleeve 104 has a shelf or notch 130 that extends circumferentially around the cavity 126 on the maximum clearance side 124. The shelf 130 forms a shelf opening 132 into the cavity 126 on the maximum clearance side 124. The shelf opening 132 has a larger cross section than the cap of the CMP sensor. The shelf 130 has a position at a shelf depth d from the maximum clearance side 124 and a shelf height h from the minimum clearance side 122. The thickness of the test sleeve 104 is essentially equal to the shelf depth d plus the shelf height h.

The test sleeve 104 has an outside surface 134 that may have a cylindrical, rectangular, triangular, or other shape. The outside surface 134 may have a knurl, another type of gripping surface, or other surface treatment. The test sleeve 104 may be made of aluminum, aluminum alloys, or like materials.

The test bar 114 is rotationally mounted by a bolt 146 in one of the threaded holes 144 formed by the clearance sides 122 and 124. Rotationally mounted includes sufficient tightness of the bolt in the hole such that the test bar remains substantially in contact with the clearance side while moving across the clearance side. The test bar 114 may be mounted on one clearance side for a first test, removed, and then mounted on the other clearance side for a second test. The test sleeve 114 may have test bars mounted on each of the clearance sides 122 and 124. The test bar may be made of iron, steel, alloys thereof, or like materials.

Referring to FIG. 2, the test sleeve 104 may have dimensions to position the end of the CMP sensor at a minimum clearance from the test bar 114. When the CMP sensor is inserted in the cavity 126 such that the cap extends out of the maximum clearance side 124, the end faces the test bar 114 when the test bar is mounted on the minimum clearance side 122. The test sleeve 104 may have a shelf height h that positions the end of the CMP sensor at a minimum clearance MIN from the test bar 114. The minimum clearance may be about 0.007 inches (0.178 mm). The minimum clearance may be in the range of about 0.007 inches (0.178 mm) through about 0.010 inches (0.254 mm). The test sleeve 104 may have a shelf height h that positions the end of the CMP sensor at other clearances or distances from the test bar 114.

Referring to FIG. 3, the test sleeve 104 may have dimensions to position the end of the CMP sensor at a maximum clearance from the test bar 114. When the CMP sensor is inserted in the cavity 126 such that the sensor cap extends out of the minimum clearance side 122, the sensor end faces the test bar 114 when the test bar 114 is mounted on the maximum clearance side 124. The thickness t of the test sleeve 104 is the distance from the minimum clearance side 122 to the maximum clearance side 124. The test sleeve 104 may have a thickness t that positions the sensor end at the maximum clearance MAX from the test bar 114. The maximum clearance may be about 0.035 inches (0.889 mm). The maximum clearance may be in the range of about 0.035 inches (0.889 mm) through about 0.040 inches (1.02 mm). Other maximum clearances may be used.

FIGS. 2–7 show various views of another test sleeve 404. The test sleeve 404 has a minimum clearance side 422 and a maximum clearance side 424. The test sleeve 404 forms a cavity 426 with an inside surface 428. The cavity 426 extends from the minimum clearance side 422 to the maximum clearance side 424 along the centerline or axis of the test sleeve 404. The cavity 426 is configured to receive a CMP sensor. The test sleeve 404 has a ridge 430 that extends circumferentially around the cavity 426 on the maximum clearance side 424. The ridge 430 forms a ridge entrance 132 into the cavity 426 on the maximum clearance side 424. The test sleeve 404 has an outside surface 434 with a knurl 446. The test bar 414 is rotationally mounted by a bolt 446 in a threaded hole 444 that extends from the minimum clearance side 422 to the maximum clearance side 424. The test bar 414 may be mounted on one clearance side for a first test and mounted on the other clearance side for a second test.

Figure 10:
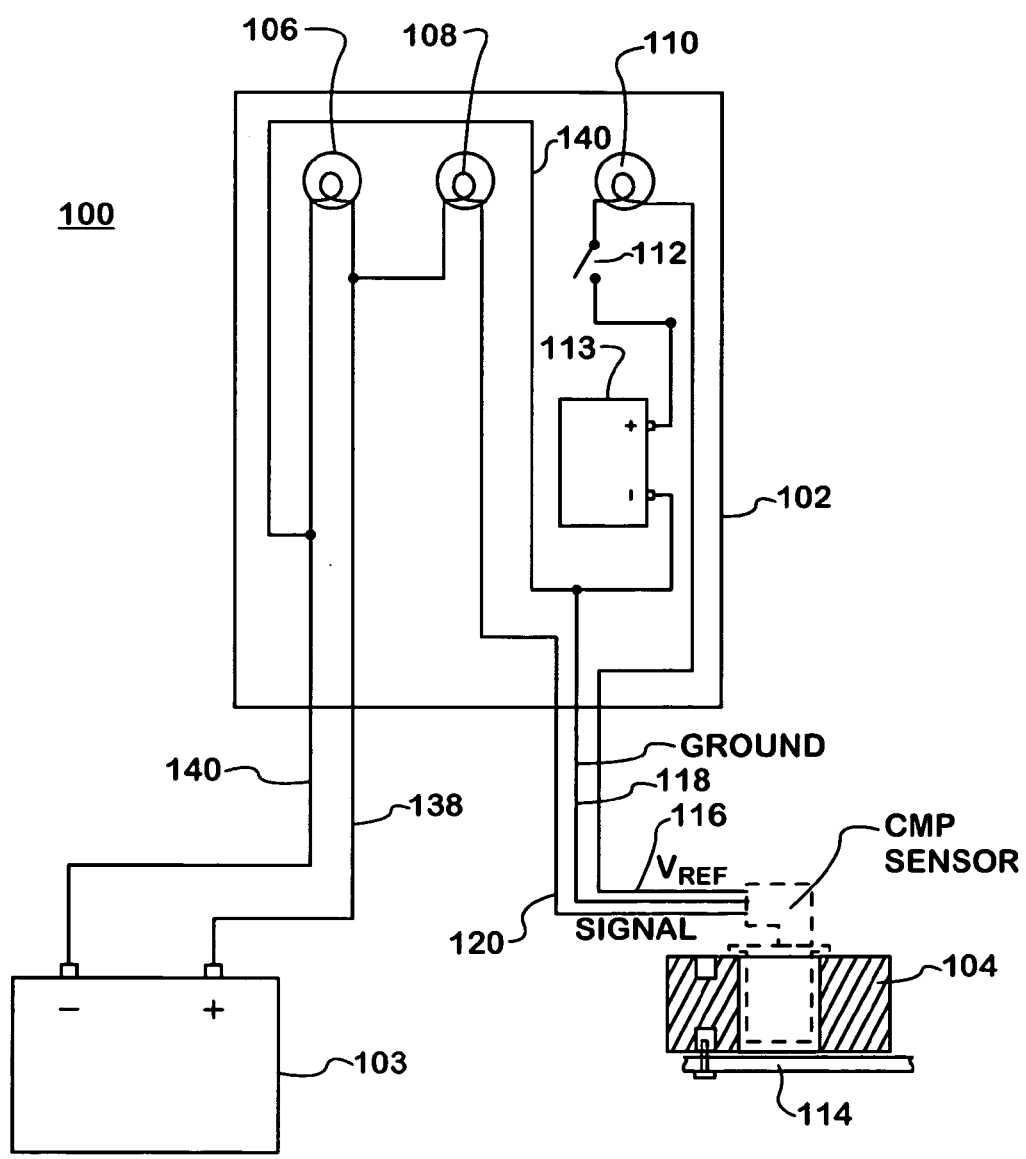
FIG. 10 is a schematic diagram of electrical circuitry for the camshaft position (CMP) sensor testing system of FIG. 1.

FIG. 10 is a schematic diagram of electrical circuitry for the camshaft position (CMP) testing system 100. The CMP testing system 100 has a controller 102 that is connected to a main voltage supply 103. The controller 102 has a main voltage indicator 106, a signal indicator 108, and a reference voltage indicator 110, a switch 112, and a reference voltage supply 113. The indicators 106, 108, and 110 may be light sources, sound sources, a combination thereof, and the like. A light source may be a light emitting diode (LED).

The controller 102 may be connected to a CMP sensor through a reference voltage $V_{REF}$ wire 116, a sensor ground wire 118, and a signal wire 120. The reference voltage $V_{REF}$ wire 116 connects to the reference voltage indicator 110. The sensor ground wire 118 connects to the connector ground wire 140 to the main voltage supply 103. The signal wire 120 connects to the signal indicator 108.

The reference voltage supply 113 is connected to the reference voltage indicator 110 through the test switch 113. The reference voltage indicator 110 is connected to the CMP sensor. The reference voltage supply 113 applies a reference voltage $V_{REF}$ to the reference voltage indicator 110 and the CMP sensor when the test switch is closed. The reference voltage indicator 110 activates or emits light in response to the reference voltage $V_{REF}$. The reference voltage supply 113 may be a battery pack, a voltage regulator connected to the main voltage supply, or the like. A battery pack may have one or more batteries. The reference voltage supply may be four "AA" size batteries. The reference voltage $V_{REF}$ may be about 5V (volts). Other reference voltages may be used.

The main voltage supply 103 applies a supply voltage $V_S$ to the main voltage indicator 106 and to the signal indicator 108 via supply wire 138. The main voltage indicator 106 activates or emits light in response to the supply voltage $V_S$. The supply voltage $V_S$ may be about 12V. Other supply voltages may be used. The main voltage supply 103 may be a battery pack, a transformer connected to household or other current, or the like. The main voltage supply 103 may be a battery for a vehicle.

During testing, the controller 102 is connected to a CMP sensor and the main voltage supply 103. The main voltage indicator 106 activates or emits light in response to the supply voltage $V_S$. The CMP sensor is inserted into the cavity 126 of the test sleeve 104. The end of the CMP sensor is facing the test bar 114. The test switch 112 is closed. The reference voltage supply 113 applies the reference voltage $V_{REF}$ to the reference voltage indicator 110 and to the CMP sensor. The reference voltage indicator 110 activates or emits light in response to the reference voltage $V_{REF}$. The test bar 114 is moved across the surface of the test sleeve 104. As the test bar 114 moves across the surface, the test bar 114 passes over the end of the CMP sensor. The movement of the test bar 114 creates a magnetic field disruption near the end of the CMP sensor. Near includes at the minimum clearance, at the maximum clearance, between the minimum and maximum clearances, and like distances from the end of the CMP sensor. Magnetic field disruption includes the presence or interruption of a magnetic field. Magnetic field disruption also includes the increase or decrease in the strength of a magnetic field. The controller 102 indicates whether the CMP sensor has sensed the magnetic field disruption. The signal indicator 108 operates intermittently or emits a flash or flashes of light or other signal if the CMP sensor has sensed the magnetic field disruption. If the signal indicator 108 does not operate intermittently, then the CMP sensor has not sensed the magnetic field disruption and is deemed to not be working properly.

Figure 11:
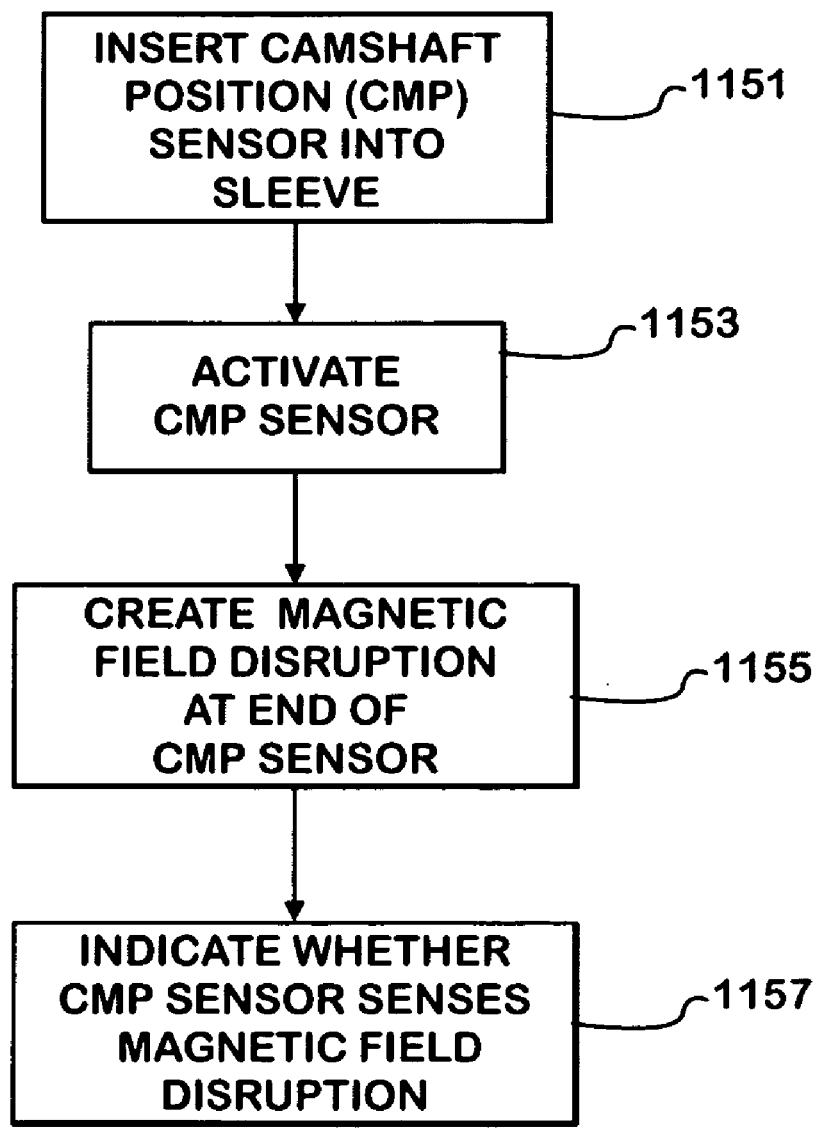
FIG. 11 is a flowchart of a method for testing a camshaft position (CMP) sensor.

FIG. 11 is a flowchart of a method of testing a camshaft position (CMP) sensor. The CMP sensor is placed into a test sleeve to determine whether the CMP sensor can sense a magnetic field disruption as previously discussed.

In block 1151, the CMP sensor is inserted a test sleeve that has a test bar rotationally mounted on one side. The end of the CMP sensor may be placed a minimum clearance from the test bar. The end of the CMP sensor may be placed a maximum clearance from the test bar. The end of the CMP sensor may be placed at other clearances and distances from the test bar.

In block 1153, the CMP sensor is activated by a controller. A signal wire, a ground wire, and a voltage reference wire are connected from a controller to the CMP sensor. The controller connects the signal and ground wires to a main voltage supply. The controller applies a reference voltage to the CMP sensor.

In block 1155, a magnetic field disruption is created near the end of the CMP sensor. The test bar is moved across the surface of the test sleeve. The test bar passes over the end of the CMP sensor. The movement of the test bar creates the magnetic field disruption.

In block 1157, the controller indicates whether the CMP sensor senses the magnetic field disruption. When operating properly, the CMP sensor changes a signal to a signal indicator in the controller in response to the magnetic field disruption. The signal indicator operates intermittently or emits one or more flashes of light in response to the signal. If the CMP sensor does not change the signal, the signal indicator does not operate intermittently which indicates the CMP sensor does not sense the magnetic field disruption.

The CMP sensor testing system may be used to test camshaft position sensors, part numbers 1821720C99 and 1825899C93, from the International Truck and Engine Corporation of Warrenville, Ill. The camshaft position testing system may be used to test other magnetic sensors, other camshaft position sensors, and the like.

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:

1. A camshaft position sensor testing system, comprising:
   a test sleeve forming a cavity;
   a test bar rotationally mounted on the test sleeve;
   a controller having a signal indicator and a reference voltage supply, where the signal indicator connects to a camshaft position sensor when the camshaft position sensor is positioned in the cavity, and where the reference voltage supply provides a reference voltage to the camshaft position sensor when the camshaft position sensor is positioned in the cavity, where the camshaft position sensor changes a signal in response to a disruption in a magnetic field, and where the signal indicator intermittently operates in response to the signal; and
   a main voltage supply connected to the signal connector, where the main voltage supply provides a supply voltage to the signal connector.

2. The camshaft position sensor testing system of claim 1, where the controller has a main voltage indicator connected to the main voltage supply, and where the main voltage indicator emits light in response to the supply voltage from the main voltage supply.

3. The camshaft position sensor testing system of claim 1, where the controller has a test switch connected to a reference voltage indicator, where the test switch is connected to the reference voltage supply, where the reference voltage indicator connects to the camshaft position sensor when the camshaft position sensor is positioned in the cavity, where the reference voltage indicator emits light when the test switch is closed, and where reference voltage supply provides the reference voltage to the camshaft position sensor when the test switch is closed.

4. The camshaft position sensor testing system of claim 1, where the signal indicator emits at least one flash of light in response to the signal.

5. The camshaft position sensor testing system of claim 1, where the supply voltage is about 12 volts, and where the reference voltage is about 5 volts.

6. The camshaft position sensor tasting system of claim 5, where the main voltage supply is a vehicle battery, and where the reference voltage supply is a battery pack.

7. The camshaft position sensor testing system of claim 1, where the test sleeve has a minimum clearance side and a maximum clearance side, where the minimum clearance side forms a first hole, where the maximum clearance side forms a second hole, where the test bar is rotationally mounted in the first hole for a first test, and, where the test bar is rotationally mounted in the second hole for the second test.

8. The camshaft position sensor testing system of claim 1, where the test sleeve has a minimum clearance side and a maximum clearance side, where the test sleeve has a shelf forming a shelf opening into the cavity on the maximum clearance side.

9. The camshaft position sensor testing system of claim 8, where the distance of the shelf from the minimum clearance side is selected to position the camshaft position sensor at a minimum clearance from the test bar.

10. The camshaft position sensor testing system of claim 9, where the minimum clearance is about 0.007 inches. (0.178 mm).

11. The camshaft position sensor testing system of claim 1, where the thickness of the test sleeve is selected to position the camshaft position sensor a maximum clearance from the test bar.

12. The camshaft position sensor testing system of claim 11, where the maximum clearance is in the range of about 0.035 inches (0.889 mm)through about 0.040 inches (1.02 mm).

13. The camshaft position sensor testing system of claim 1, where the test sleeve is made of aluminum, and where the test bar is made of steel.

14. A method for testing a camshaft position sensor, comprising:
  inserting a camshaft position sensor in a test sleeve;
  activating the camshaft position sensor;
  placing an end of the camshaft position sensor at a distance from a test bar on the test sleeve;
  moving the test bar across the test sleeve;
  disrupting a magnetic field of the camshaft position sensor; and
  indicating whether the camshaft position sensor senses a magnetic field disruption.

15. The method of testing a camshaft position sensor of claim 14, wherein the distance is a minimum clearance between the test bar and the camshaft position sensor.

16. The method of testing a camshaft position sensor of claim 14, wherein the distance is a maximum clearance between the test bar and the camshaft position sensor.

17. The method of testing a camshaft position sensor of claim 14, further comprising applying a reference voltage to the camshaft position sensor.

18. The method of testing a camshaft position sensor of claim 17, where the reference voltage is about 5 volts.

19. The method of testing a camshaft position sensor of claim 14, further comprising:
  changing a signal from the camshaft position sensor to a signal indicator; and
  intermittently operating the signal indicator in response to the signal.

20. The method of testing a camshaft position sensor of claim 19, further comprising emitting a least one flash of light from the signal indicator.

* * * * *